(12) United States Patent
Bianchini

(10) Patent No.: US 9,320,370 B1
(45) Date of Patent: Apr. 26, 2016

(54) METHOD AND APPARATUS FOR SUSPENDING A PACKAGE IN AN ELEVATED POSITION

(76) Inventor: Jay G. Bianchini, Covington, LA (US)

( * ) Notice: Subject to any disclaimer, the term of this patent is extended or adjusted under 35 U.S.C. 154(b) by 316 days.

(21) Appl. No.: 13/613,039

(22) Filed: Sep. 13, 2012

(51) Int. Cl.
| | | |
|---|---|---|
| *A47F 5/08* | (2006.01) | |
| *A47F 5/00* | (2006.01) | |
| *E04B 9/00* | (2006.01) | |
| *E04B 9/18* | (2006.01) | |

(52) U.S. Cl.
CPC ............... *A47F 5/0892* (2013.01); *A47F 5/00* (2013.01); *E04B 9/006* (2013.01); *E04B 9/183* (2013.01)

(58) Field of Classification Search
CPC .......... E04B 9/18; E04B 9/183; E04B 9/006; A47F 5/0892
USPC ................. 211/113, 117, 118, 119; 108/42; 248/58, 317, 328, 610, 612; 52/39, 52/506.06
See application file for complete search history.

(56) References Cited

U.S. PATENT DOCUMENTS

| | | | |
|---|---|---|---|
| 2,231,153 A | 2/1941 | Camiener | |
| 2,311,410 A | 2/1943 | Meyer | |
| 2,317,428 A | 4/1943 | Anderson | |
| 2,419,317 A | 4/1947 | Hall | |
| 2,657,442 A | 11/1953 | Bedford, Jr. | |
| 2,659,950 A | 11/1953 | West | |
| 2,676,680 A * | 4/1954 | Kindorf | 403/22 |
| 2,982,508 A | 5/1961 | Larsen et al. | |
| 3,334,465 A * | 8/1967 | Hoffmann, Jr. | 52/718.05 |
| 3,360,151 A | 12/1967 | Yznaga | |
| 3,368,780 A | 2/1968 | Buttriss | |
| 3,441,240 A | 4/1969 | Kindorf | |
| 3,474,994 A | 10/1969 | Swanquist | |
| 3,532,311 A | 10/1970 | Havener | |
| 3,602,473 A * | 8/1971 | Van Riet et al. | 248/317 |
| 3,606,223 A | 9/1971 | Havener | |
| 3,613,177 A | 10/1971 | Davis | |
| 3,720,395 A | 3/1973 | Schuplin | |
| 3,844,087 A | 10/1974 | Schultz et al. | |
| 3,888,441 A | 6/1975 | Rebentisch | |
| 3,959,852 A | 6/1976 | Sasena | |
| 3,993,272 A | 11/1976 | Lindeman | |
| 4,041,668 A * | 8/1977 | Jahn et al. | 52/506.09 |
| 4,133,509 A | 1/1979 | Kalbow et al. | |
| 4,393,859 A | 7/1983 | Marossy et al. | |
| 4,415,957 A | 11/1983 | Schwartz | |
| 4,429,440 A | 2/1984 | Laughlin et al. | |
| 4,544,119 A * | 10/1985 | Kellett et al. | 248/58 |
| 4,640,064 A * | 2/1987 | Goodworth, II | 52/506.08 |
| 4,680,905 A | 7/1987 | Rockar | |

(Continued)

*Primary Examiner* — Stanton L Krycinski
(74) *Attorney, Agent, or Firm* — Garvey, Smith, Nehrbass & North, L.L.C.; Brett A. North

(57) ABSTRACT

One embodiment provides a method and apparatus for suspending air conditioning duct works from a support structure comprising unistrut type support beams which apparatus includes a plurality of support brackets arranged and configured for being slidably interlockable with the interior of the unistrut beam members. Multiple support rods can be used to support a frame member even where the support rods are not symmetrically located along the length of the support beam as the support bracket can be slid/moved inside the support beam until lining up with its respective support rod. Additionally, the entire support framework can be moved relative to the plurality of support rods by sliding the framework relative to the support brackets. In such manner the location of the supporting frame member can be changed without moving the support rods.

18 Claims, 10 Drawing Sheets

(56) References Cited

U.S. PATENT DOCUMENTS

| | | |
|---|---|---|
| 4,787,587 A | 11/1988 | Deming |
| 4,971,280 A | 11/1990 | Rinderer |
| 5,022,614 A | 6/1991 | Rinderer |
| 5,274,978 A | 1/1994 | Perkonigg et al. |
| 5,366,190 A | 11/1994 | Schaefer et al. |
| 5,545,843 A | 8/1996 | Arvidsson et al. |
| 5,619,263 A | 4/1997 | Laughlin et al. |
| 5,704,571 A * | 1/1998 | Vargo ............................... 248/58 |
| 5,709,057 A | 1/1998 | Johnson, Jr. et al. |
| 5,740,994 A | 4/1998 | Laughlin |
| 5,746,029 A | 5/1998 | Ullman |
| 5,788,201 A | 8/1998 | Hardison |
| 5,813,641 A | 9/1998 | Baldwin |
| 5,921,509 A | 7/1999 | Flood et al. |
| 6,049,963 A | 4/2000 | Boe |
| 6,086,029 A | 7/2000 | Oliver |
| 6,330,991 B1 | 12/2001 | Boe |
| 6,354,542 B1 * | 3/2002 | Meyer et al. .................... 248/58 |
| 6,370,828 B1 | 4/2002 | Genschorek |
| 6,464,180 B2 | 10/2002 | Workman |
| 6,467,228 B1 * | 10/2002 | Wendt et al. ............... 52/506.07 |
| 6,502,363 B1 * | 1/2003 | Roth ................................ 52/846 |
| 6,508,440 B2 | 1/2003 | Schmidt |
| 6,631,601 B1 * | 10/2003 | Roth ................................ 52/846 |
| 6,976,660 B2 | 12/2005 | Lapointe et al. |
| 7,043,884 B2 | 5/2006 | Moreno |
| 7,320,453 B2 * | 1/2008 | Berlyn et al. .................. 248/328 |
| 7,360,745 B2 | 4/2008 | Nikayin et al. |
| 7,367,538 B2 * | 5/2008 | Berlyn .......................... 248/317 |
| D576,478 S | 9/2008 | Mead et al. |
| 7,810,438 B2 * | 10/2010 | Ryberg ........................... 108/42 |
| 7,954,287 B2 | 6/2011 | Bravo et al. |
| 8,091,839 B2 | 1/2012 | Whipple et al. |
| 8,596,008 B2 * | 12/2013 | Waters et al. ............. 52/506.06 |
| 8,745,946 B2 * | 6/2014 | D'Alessandro et al. ... 52/506.05 |
| 2002/0100843 A1 | 8/2002 | Schmidt |
| 2004/0163338 A1 | 8/2004 | Liebendorfer |
| 2005/0211847 A1 | 9/2005 | Pattie et al. |
| 2006/0027715 A1 | 2/2006 | Dinh et al. |
| 2007/0094994 A1 | 5/2007 | Singleton |
| 2009/0282755 A1 | 11/2009 | Abbott et al. |
| 2011/0073718 A1 * | 3/2011 | Whipple et al. ................. 248/58 |
| 2012/0031039 A1 | 2/2012 | Cusson et al. |

* cited by examiner

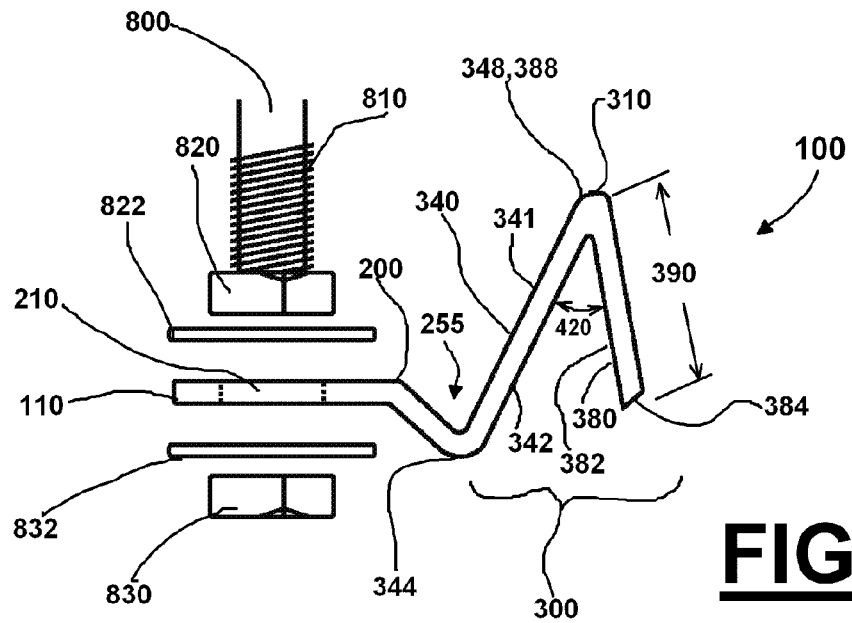
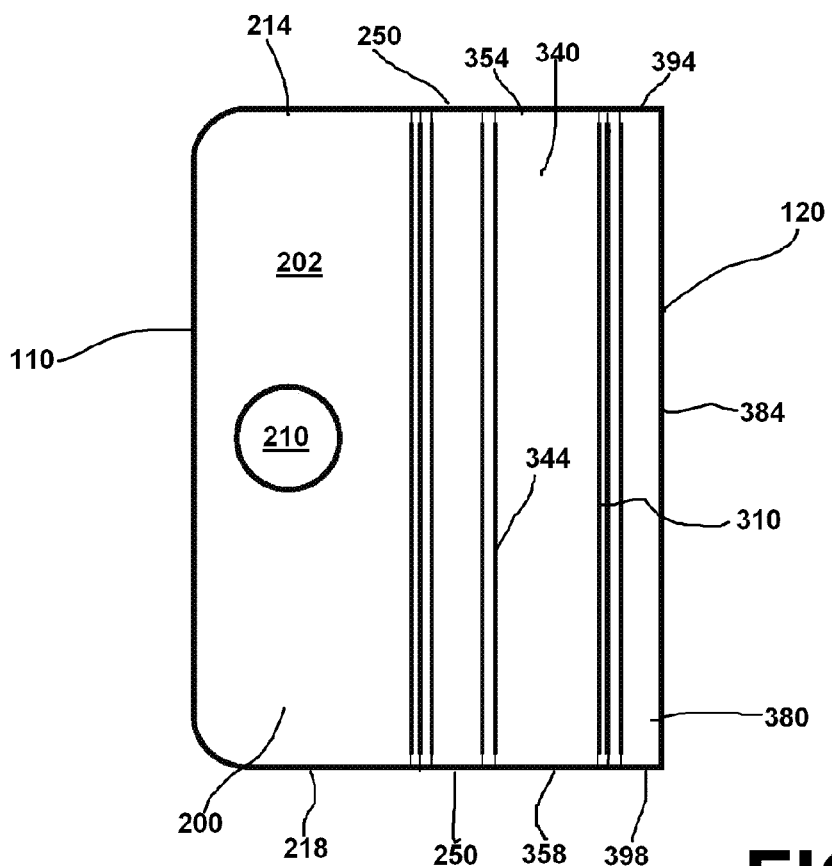

METHOD AND APPARATUS FOR SUSPENDING A PACKAGE IN AN ELEVATED POSITION

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND

In supporting packages at elevated positions with structural support systems vertical locations such as ceilings or roofing frameworks, difficulties exist because of the irregular locations of possible tensile support connections.

It would be desirable to have a method and apparatus which allows the user to compensate for the irregular spacing of vertical tensile members when supporting the structural support systems with packages to be supported through the use of support brackets which are longitudinally adjustable relative to the longitudinal length of the structural support system.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

The apparatus of the present invention solves the problems confronted in the art in a simple and straightforward manner.

One embodiment provides a method and apparatus for suspending air conditioning duct works from a support structure comprising unistrut type support beams which apparatus includes a plurality of support brackets arranged and configured for being slidably interlockable with the interior of the unistrut beam members.

In one embodiment the support brackets can be slid inside the interior of the support beam until adjacent a support beam which support beam can be connected to the support bracket. In like manner additional support brackets can be inserted into the interior of the support beam members to be adjustably located next to their respective support rod. In such manner multiple support rods can be used to support a frame member even where the support rods are not symmetrically located along the length of the support beam as the support bracket can be slid/moved inside the support beam until lining up with its respective support rod. Additionally, the entire support framework can be moved relative to the plurality of support rods by sliding the framework relative to the support brackets. In such manner the location of the supporting frame member can be changed without moving the support rods.

One embodiment generally relates to devices for supporting frame members, and more particularly to an apparatus for supporting a frame comprising multiple unistrut support beams with slidable type support brackets.

One embodiment provides an apparatus for suspending a frame member from a support structure (e.g., a building frame) which includes a plurality of slidably interlockable support brackets.

In one embodiment, the brackets can comprise a V-shaped element having an upright The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 4 is a top view of the bracket of FIG. 1.

FIG. 5 is a side view of the bracket of FIG. 1 with an exploded view of a support arm for such bracket.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1:
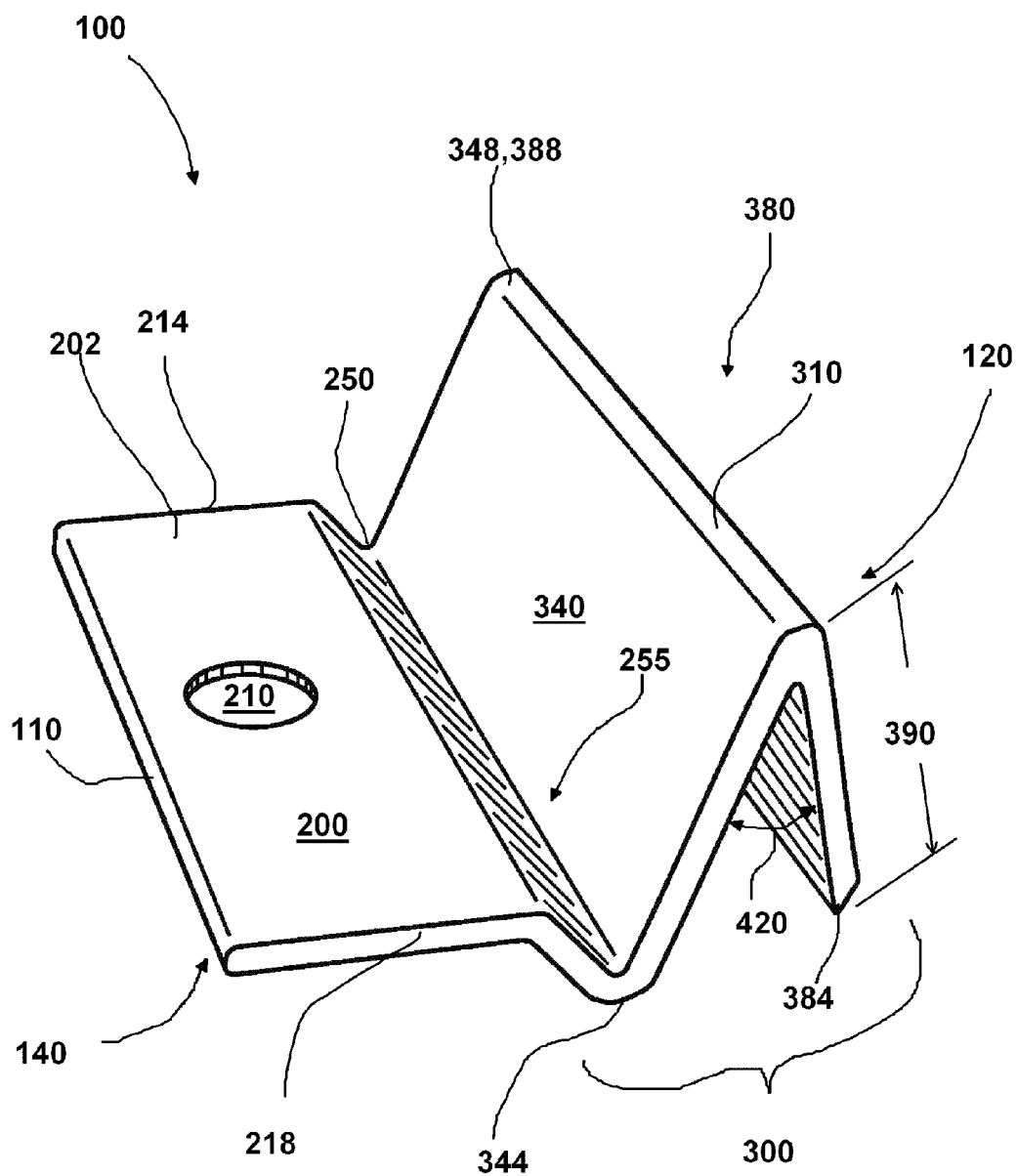
FIG. 1 is a perspective view of one embodiment of a support bracket.
Figure 2:
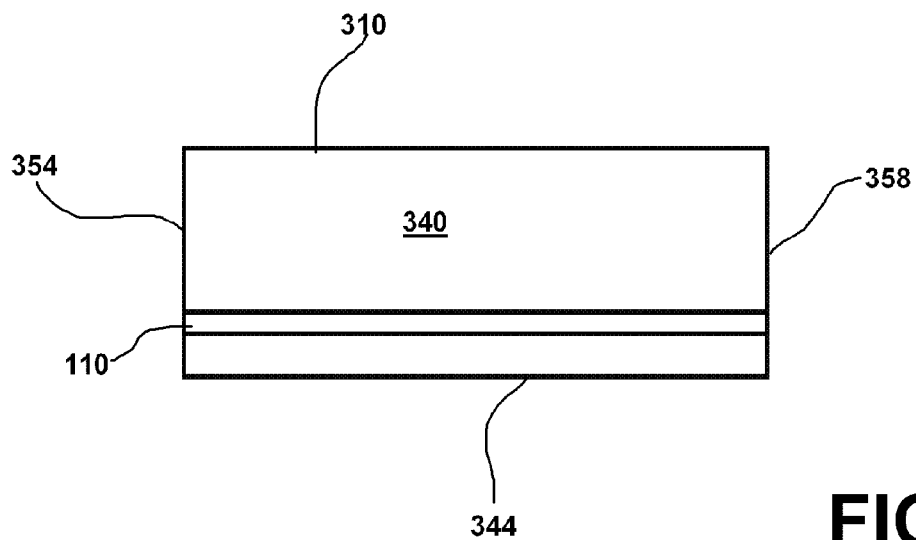
FIG. 2 is a front view of the bracket of FIG. 1.
Figure 3:
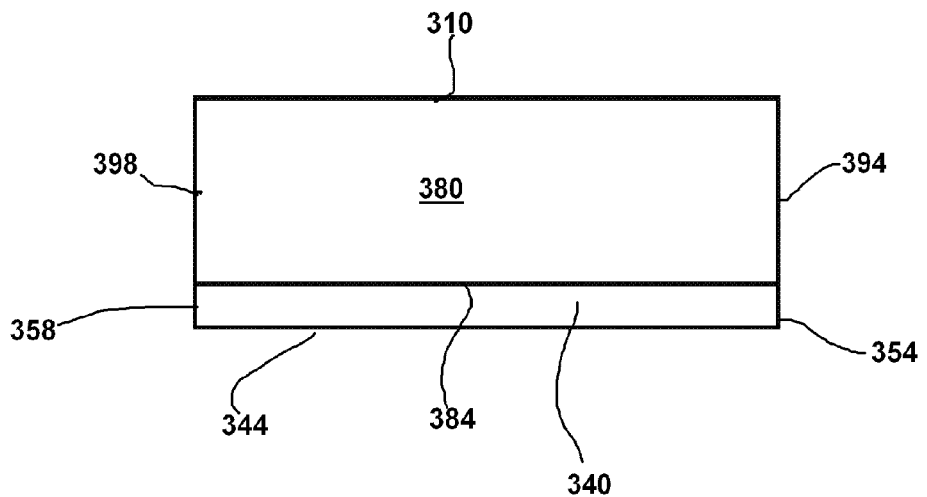
FIG. 3 is a rear view of the bracket of FIG. 1.

FIG. 1 is a perspective view of one embodiment of a support bracket 100 in accordance with one embodiment. FIG. 2 is a front view of support bracket 100. FIG. 3 is a rear view of support bracket 100. FIG. 4 is a top view of support bracket 100.

In this disclosure a single support bracket 100 will be described in detail. However, it is to be understood that the various support brackets (e.g., 100', 100", 100"' etc.) can be constructed substantially similar to support bracket 100 and do not need to be described separately.

Generally, support bracket 100 can comprise locking section 300 which is connected to support flange 200. Support bracket 100 can have first end 110 and second end 120, along with an apex 310 and lower end 384. In various embodiments transition portion 250 can be provided between support flange 200 and locking section 300 of support bracket 100.

In various embodiments this transition section can include a recessed area 255 between support section 200 and locking section 300 can be provided. In one embodiment recessed 255 area can be an upwardly facing socket which accepts socket 942. In one embodiment recessed area 255 as a socket can comprise two planer flanges forming a "V" shape. In other embodiments recessed area 255 can be other shapes wherein recessed area cradling socket 942 of framing member 900. In various embodiments this recessed area 255 can be omitted and support flange 200 can be planer at its transition 250 with locking section 300.

In one embodiment upper surface 202 of support section can be at a vertical height which is at least equal to the top of socket 942. In various embodiments upper surface 202 can be at a larger vertical height than the top of socket 942.

In one embodiment upper surface 202 of support section can be at a vertical height which is at least equal to the bottom of socket 942. In various embodiments upper surface 202 can be at a larger vertical height than the bottom of socket 942.

Locking section 300 can comprise first flange 340 which is connected to second flange 380. First and second flanges 340, 380 can form a V-shaped locking section. First flange 340 can be planer, as can be second flange 380.

First flange 340 can include first side 354 and second side 358, along with lower end 344 and upper end 348. Second flange 380 can include first side 394 and second side 398, along with lower end 384 and upper end 388.

Support flange 200 can be attached to locking section 300 via curved section 250. Support flange 200 can include first side 214 and second side 218, along with lower surface 204 and upper surface 208.

FIG. 5 is a side view of support bracket 100 with an exploded view of a tensile member 800 (e.g., arm/rod/chain/cord/wire) for supporting in an elevated position bracket 300 hanging from a overhead support system such as a ceiling, beam, frame, etc.

Support bracket 100 can be attached to tensile member 800 via opening 210 using threaded area 810, first nut 820 and second nut 830. Washers 822 and 832 can be used if desired.

As shown in FIG. 5 second portion 380 of locking section 300 can have a height 390 between apex 310 and lower end 384 of second flange 380. First flange 340 and second flange 380 can make an angle 420. Angle 420 can be about 5, 10, 15, 20, 25, 30, 35, 40, 45, 50, 55, 60, 65, 70, 75, 80, 85, and 90 degrees. In various embodiments angle 420 can be between about any two of the above referenced degree measurements.

Figure 6:
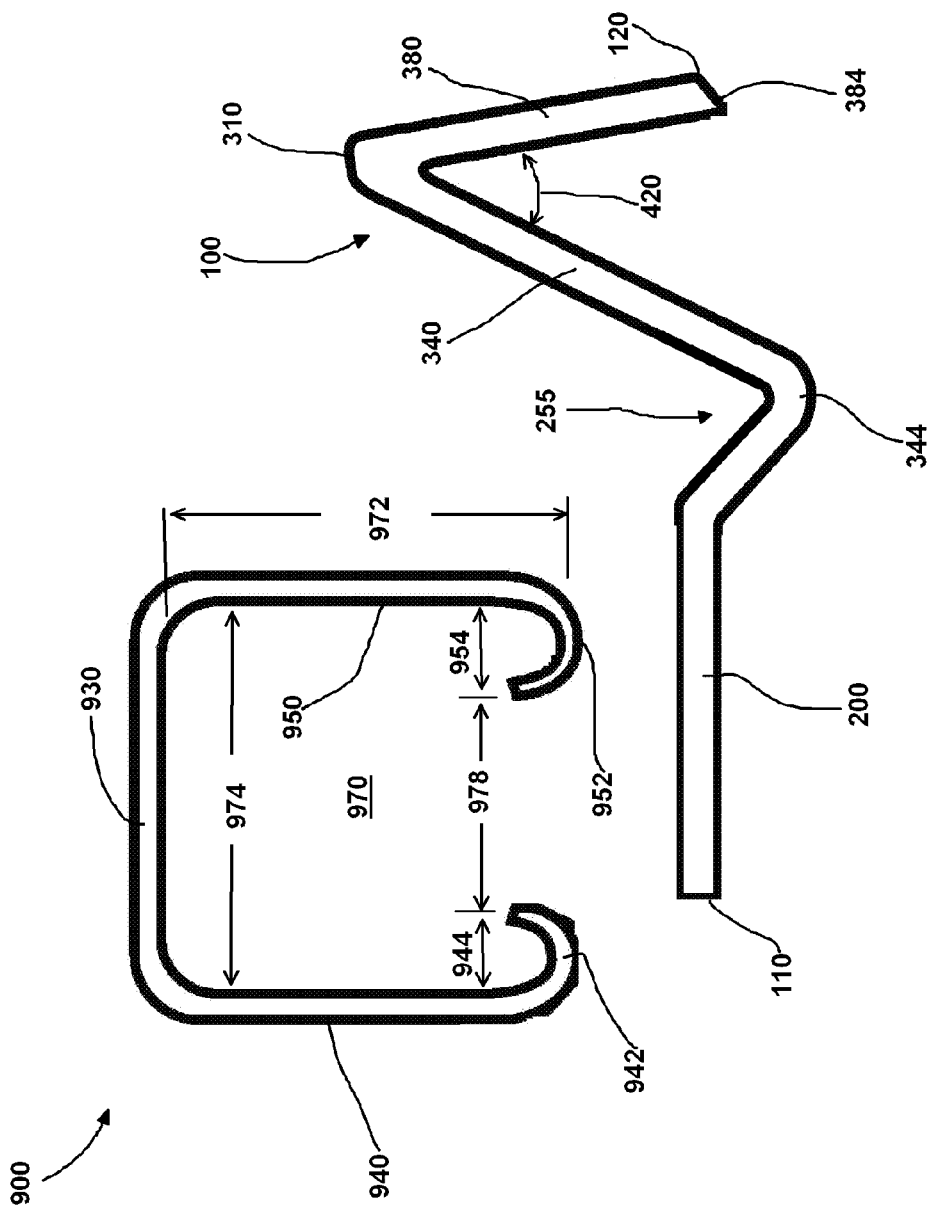
FIG. 6 shows side view of the bracket in FIG. 1 along with a unistrut frame member in which the bracket can be inserted.

FIG. 6 shows side view of support bracket 100 along with a unistrut frame member 900 in which bracket 100 can be inserted in a locking fashion. In this disclosure a single frame member 900 100 will be described in detail. However, it is to be understood that the various framing members (e.g., 900', etc.) can be constructed substantially similar to frame member 900, and do not need to be described separately.

Framing member 900 can comprise top web 930 along with first flange 940 and second flange 950, and have first end 910 and second end 920. Top web 930 generally makes a 90 degree angle with first and second flanges 940,950. Between top web 930 and first and second flanges 940, 950 can be interior 970. Interior 970 can have a width 974 and height 972.

At the bottom end of first flange 940 can be a socket 944 which generally faces interior 970, and in various embodiments faces top web 930. At the bottom end of second flange 950 can be socket 954 which generally faces interior 970, and in various embodiments top web 930. Between socket 942 and socket 954 can be an open gap 978.

Figure 7:
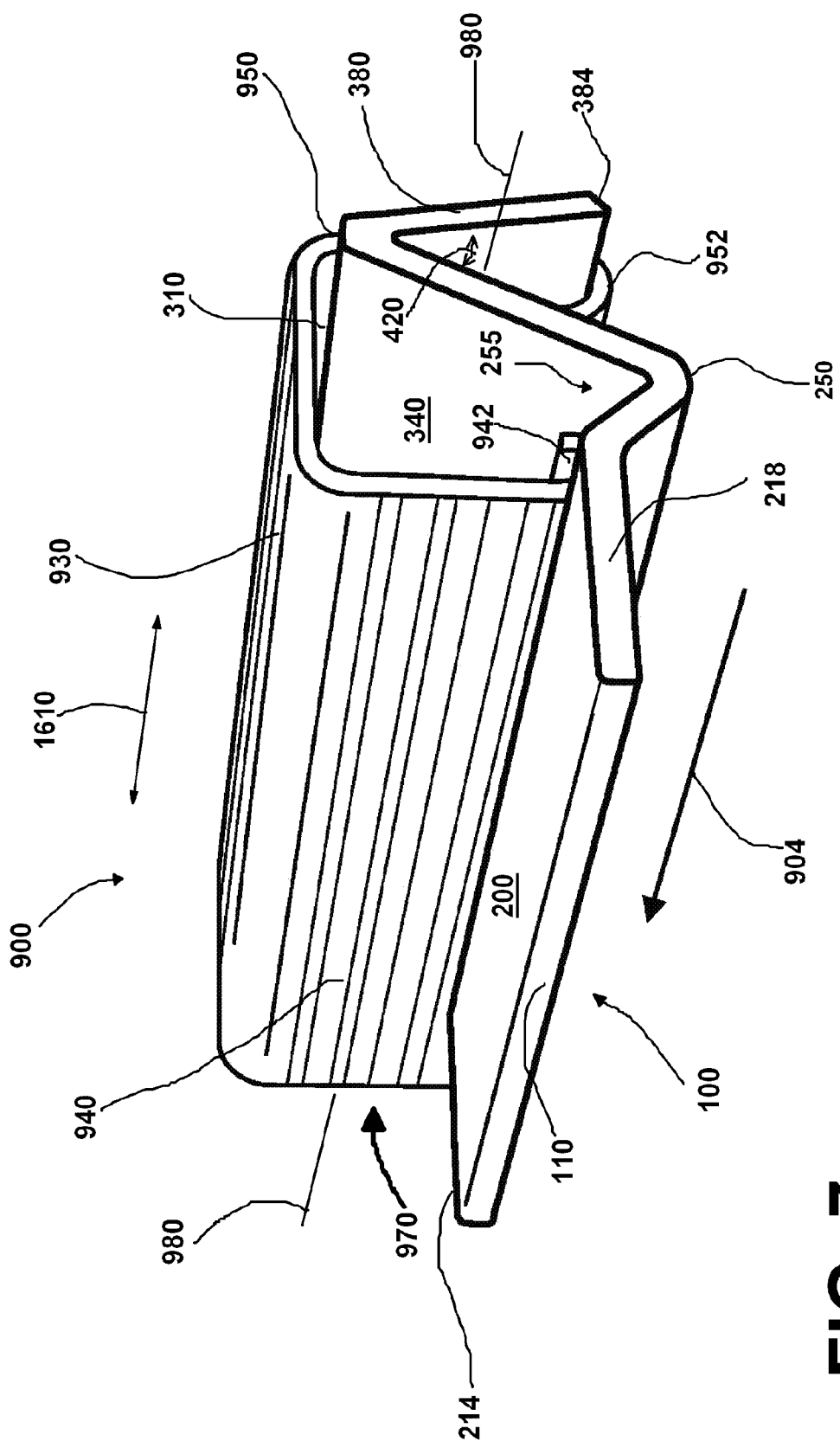
FIG. 7 is a perspective view of the bracket of FIG. 1 being inserted into a unistrut frame.
Figure 8:
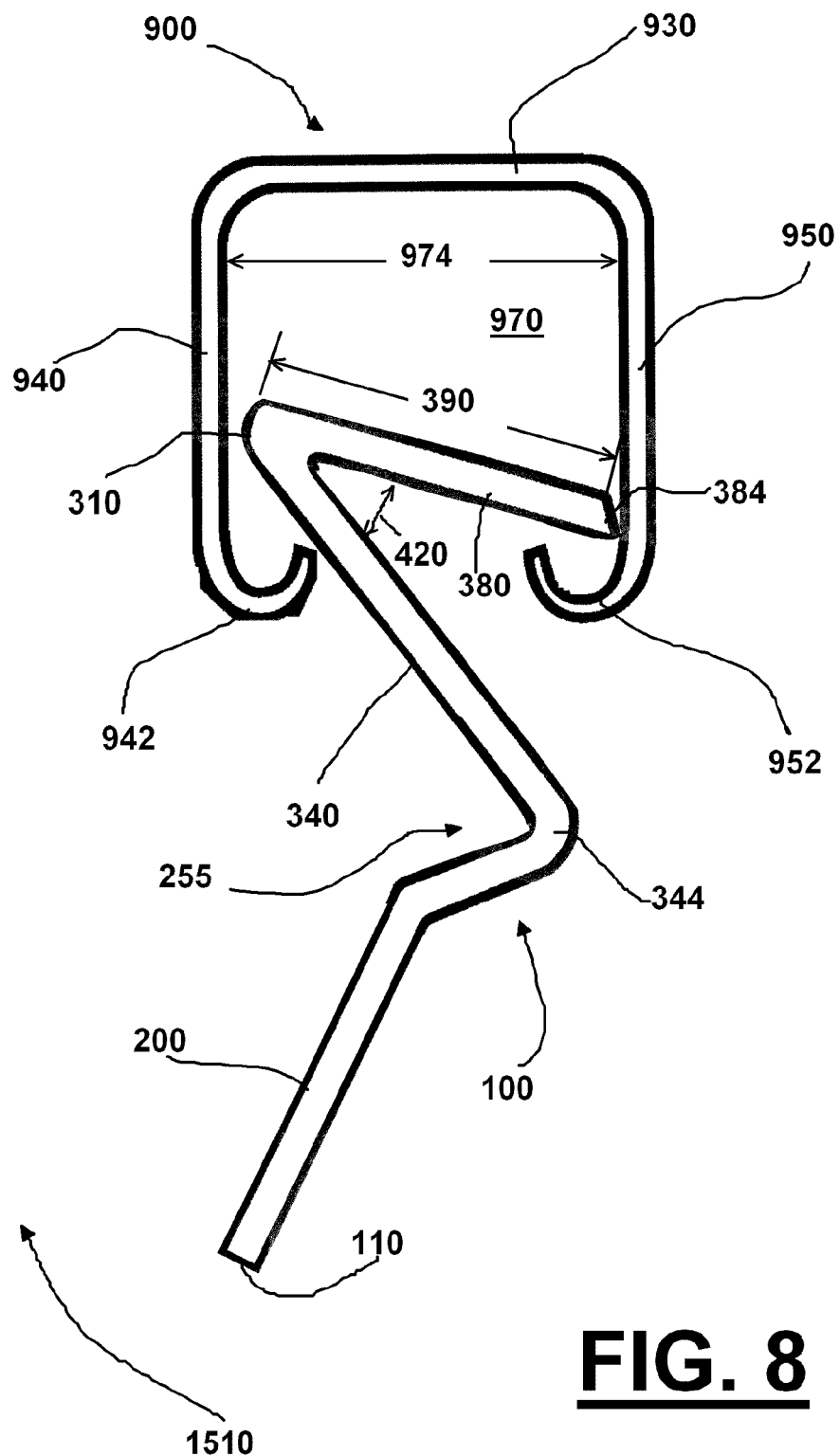
FIG. 8 is a side view of the bracket of FIG. 7 now inserted into the unistrut frame and showing the bracket hanging in an unsupported position in the interior of the unistrut frame.
Figure 9:
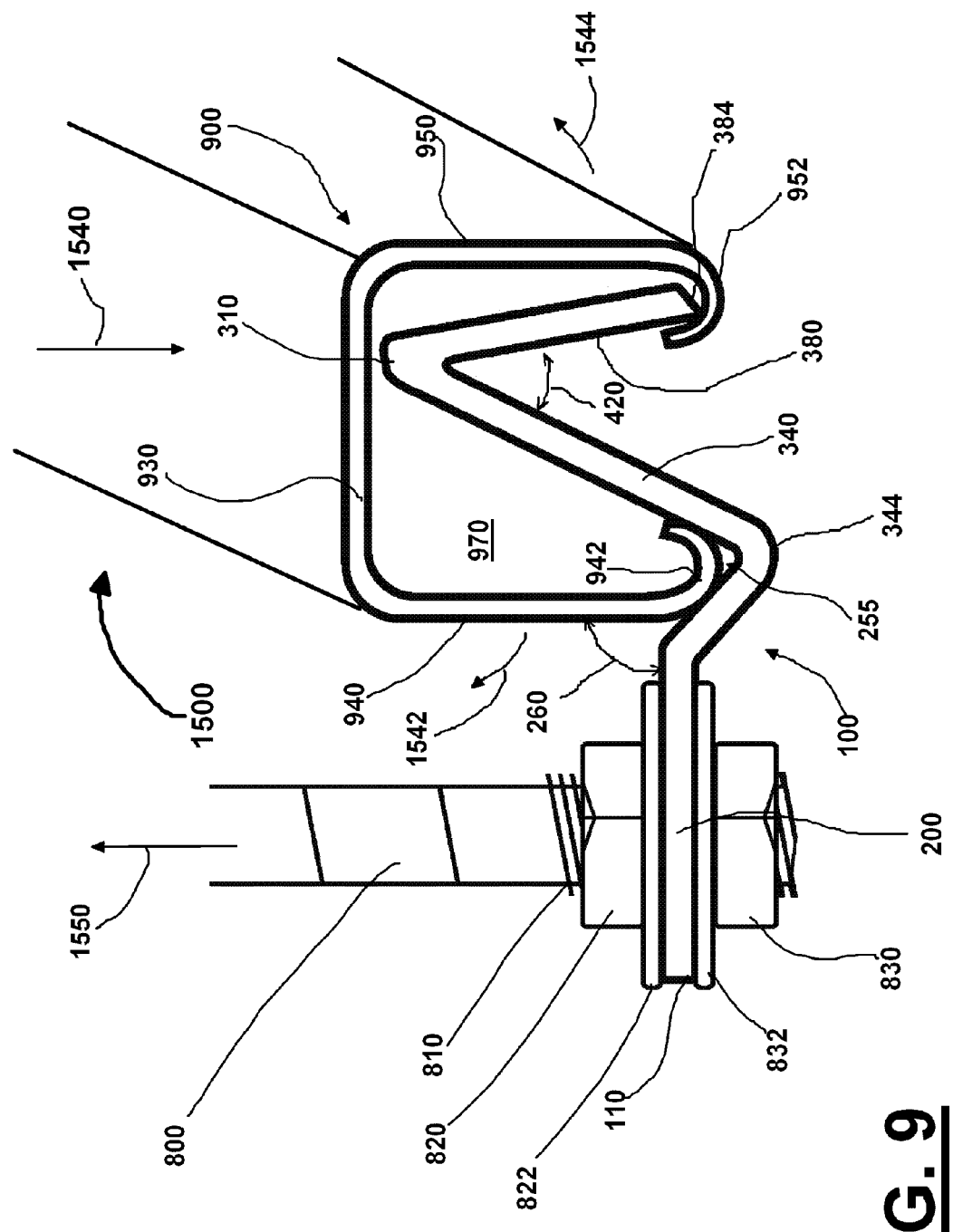
FIG. 9 is a side view of the bracket of FIG. 7 now inserted into the unistrut frame and with the bracket being supported by a support arm, and the bracket now supporting the unistrut frame.

FIGS. 7, 8, and 9 illustrate the flexibility of positioning and frictionally locking support bracket 100 in framing member 900.

FIG. 7 is a perspective view of support bracket 100 being inserted into framing member 900 through first end 910 (schematically indicated by arrow 904). FIG. 8 is a side view of support bracket 100 now inserted into framing member 900 and showing bracket 100 hanging in a locked but unsupported position in the interior 970 of frame. FIG. 9 is a side view of support bracket 100 now inserted into framing member 900 and with the bracket 100 being supported by support arm 800 and tending to apply to bracket 100 a rotational torque in the direction of arrow 1510 against framing member 900, with bracket 100 now supporting the framing member 900 and being in a longitudinally locked position (i.e., locked in the direction of longitudinal centerline 980). Such longitudinal locking occurs because of the frictional forces arising between bracket 100 and framing member 900 (where end 384 of bracket 100 is frictionally engaged with the interior side of socket 952 of framing member 900, and transition 250 of bracket 100 frictionally engages with the exterior side of socket 942 of framing member 900.

As schematically indicated in FIG. 8, support bracket 100 is frictionally unlocked relative to framing member 900 when not attached to rod 800—where any frictional forces between support bracket 100 and framing member 900 are minimized, and allowing support bracket 100 to be rotated in the direction of arrow 1510 and slidably adjusted in a longitudinal direction while remaining within framing member 900. This slidable adjustability is schematically indicated by arrows 1610 in FIG. 7. It is noted that in this longitudinally-frictionally unlocked state, support bracket 100 is preferably still maintained in framing member 900 based on height 390 of second flange 390 being larger than the open distance 978 between socket 942 and socket 954, and preferably larger than the larger of: (a) width 974 less width 944 and (b) width 974 less width 954. In this manner bracket 100 will tend not to fall out of the interior 974 of framing member 900.

FIG. 9 schematically shows bracket 100 entering a frictionally longitudinal locked (arrow 1500) and supported state relative to framing member 900. In this state lower end 384 of bracket 100 will enter the interior of socket 952, and bracket 100 will push against the exterior of socket 942. Tensile member 800 supports support bracket 100, and support bracket 100 supports framing member 900 as schematically indicated by arrow 1550.

As schematically shown in FIG. 9, support bracket can be frictionally locked relative to framing member 900 be attaching rod 800 causing support bracket to be rotated direction of arrow 1500 entering a frictionally locked and supported state relative to framing member 900. In this state lower end 384 of bracket 100 will enter the interior of socket 952, and bracket 100 will push against the exterior of socket 942. Tensile member 800 supports support bracket 100 in the direction of arrow 1550, and support bracket 100 supports framing member 900 also in the direction of arrow 1550.

Recessed area 255 can form a socket which reinforces the structural rigidity of framing member 900. As schematically indicted in FIG. 9 a load (indicated by arrow 1540) applied to framing member 900 will tend to cause flanges 940 and 950 to outwardly flex (schematically indicated by arrows 1542 and 1544). With such an event, in combination (a) recessed area 255 (e.g., acting as a socket) can cradle the end of flange 940 and (b) lower end 384 of second flange 380 held in socket 942 will resist such tendency of the flanges 940 and 950 to outwardly flex and thereby increase the amount of load framing member 900 can take before failure. In various embodiments, when compared to having not having flanges 940 and 940 reinforced against outwardly bending, such increase in load capacity can be greater than about 10, 20, 30, 40, 50, 60, 70, 80, 90, 100 percent.

Figure 12:
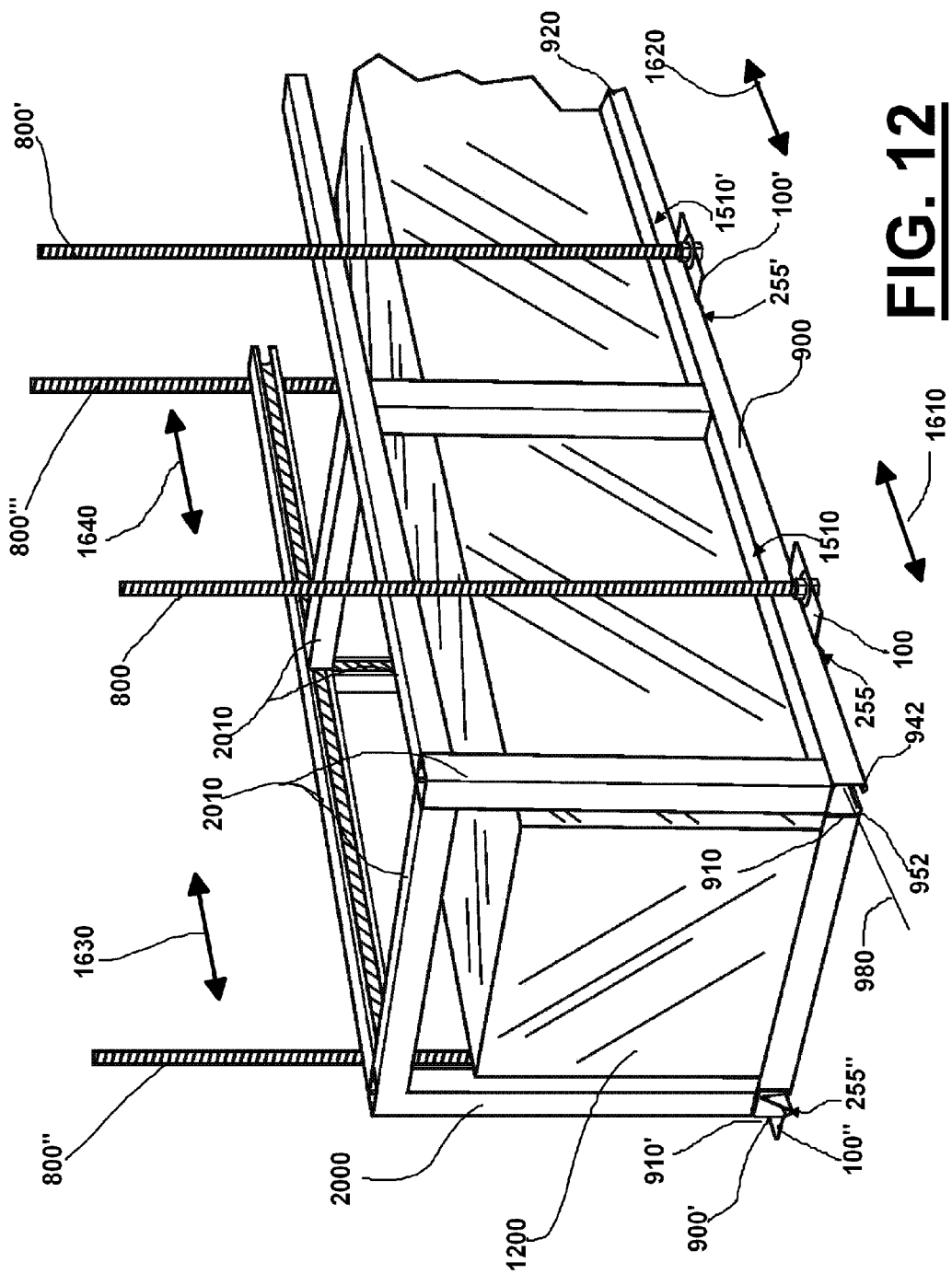
FIG. 12 is a perspective view of a support frame for an A/C duct which support frame is supported by a set for four brackets of the construction shown in FIG. 1.

As shown in FIG. 12 framing member 900 is part of an overall support structure 1000 for supporting a package 1200 in an elevated position, the structural configuration of support structure 2000 (e.g., plurality of interconnected support beams 2010) will resist framing member 900 from rotating in the direction of arrow 1500 when tensile member places a rotational load on bracket 100 which rotational load is transferred to support beam 900.

In various embodiments the height of locking section (distance between lower end 384 and apex 310) can be greater than 50 percent of the height 972 of interior 970 of support beam 900. In various embodiments the height can be greater than 50, 55, 60, 65, 70, 75, 80, 85, 90, and 95 percent of the height 972 of interior 970 of support beam 900. In various embodiments the height can be between about any two of the above referenced percentages.

In FIG. 9 is shown angle 260 can be formed between support flange 200 and first flange 940. Angle 260 can be about 45, 55, 65, 75, 85, 90, 95, 105, 115, 125, and 135 degrees. In various embodiments angle 260 can be between about any two of the above referenced degree measurements.

Figure 10:
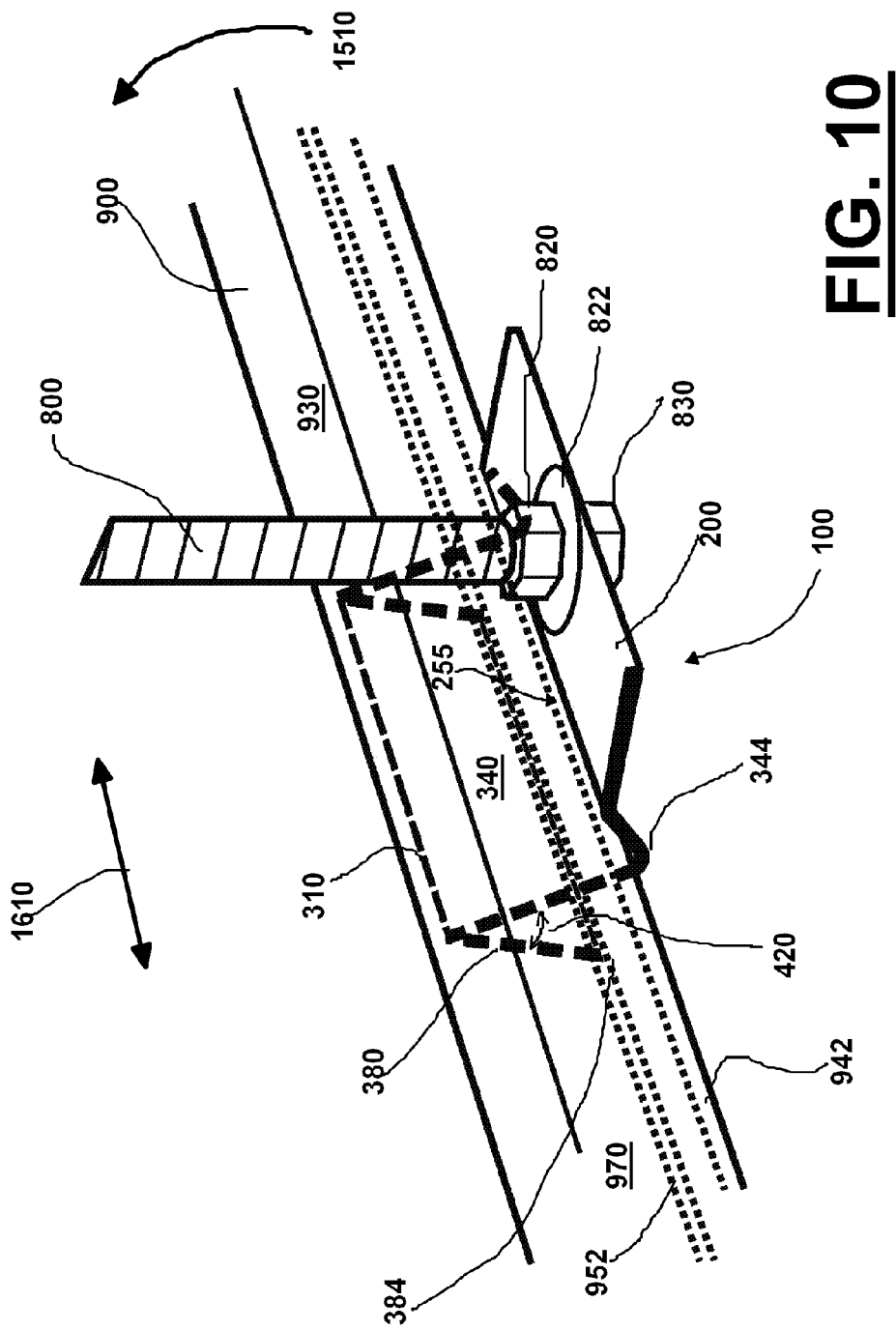
FIG. 10 is an enlarged view of one of the bracket in FIG. 7 where the portion of the bracket in the interior of the unistrut frame is shown in dashed lines.
Figure 11:
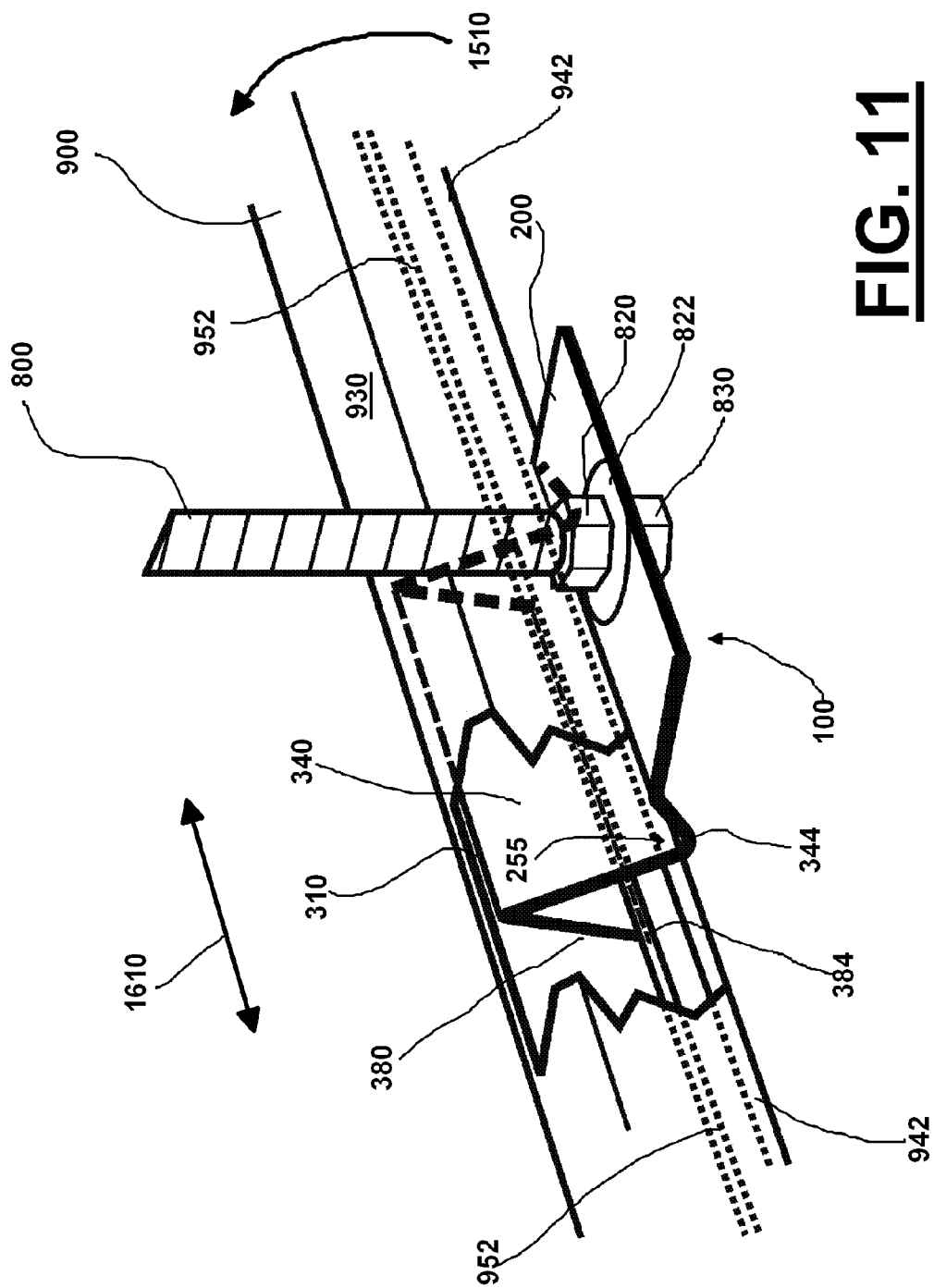
FIG. 11 is an enlarged view of the bracket shown in FIG. 7 where a portion of the unistrut frame has been cutaway.

FIG. 10 is an enlarged view of support bracket 100 where the portion of bracket 100 in the interior 970 of framing member 900 is shown in dashed lines. FIG. 11 is an enlarged view of support bracket 100 where a portion of framing member 900 has been cutaway.

FIG. 12 is a perspective view of a support frame 2000 which supports, in an elevated position, a package 2200 (e.g., A/C ductwork). Support frame 2000 can comprise framing members 900 and 900' along with a plurality of interconnected support beams 2010. Support frame 2000 can be supported in an elevated position by a plurality of tensile members 800, 800', 800", etc. which are respectively supporting a plurality of support brackets 100, 100', 100", etc. which are connected to a framing member 900 or 900'.

Tensile members tensile members 800, 800', 800", etc. can themselves be supported themselves in a structure such as a ceiling, rafters, beams, etc. Tensile members 800 can be any structural element strong enough to support load or package 1200 at an elevated position in relation to a ground surface. Such members can be arms, rods, chains, cords, wires, etc.

As schematically indicated in FIG. 12, in one embodiment the method comprises the following steps:

(a) providing a support structure 2000 comprising first and second framing members 900,900', each having first and second ends and interiors, which framing members 900, 900' are structurally interconnected with each other;

(b) provide a plurality of support brackets 100,100';

(c) inserting at least one of the plurality of support brackets (bracket 100) into the interior 970 of support frame 900, and sliding (schematically indicated by arrows 1610) the bracket 100 into a selected longitudinal position relative to support frame 900, and between the first and second ends of support frame 900;

(d) inserting at least one of the plurality of support brackets (bracket 100") into the interior 970" of support frame 900', and sliding (schematically indicated by arrows 1630) the bracket 100' into a selected longitudinal position relative to support frame 900', and between the first and second ends of support frame 900;

(e) supporting the support bracket 100 in an elevated position with a tensile member 800;

(f) supporting the support bracket 100" in an elevated position with a tensile member 800"; and (g) wherein support structure 2000 includes a package 1200 to be elevated.

In various embodiments the support brackets can be constructed substantially similar to each other.

In various embodiments the support brackets can include connecting structure 300 which includes first 340 and second 380 flanges.

In various embodiments the support beams 900 can include first 942 and second 952 sockets.

In one embodiment, the structural framework can include a first support beam 900 having a longitudinal axis 980, and the first support bracket 100, when inserted into the interior 970 of the first support beam 900 has locked resting and supported positions relative to the longitudinal axis 970, and the amount of relative rotation of the support bracket 100 between these two positions relative to the longitudinal axis 970 can be at least 5, 10, 15, 20, 30, or 45 degrees.

The following is a list of reference numerals:

| LIST FOR REFERENCE NUMERALS | |
|---|---|
| (Reference No.) | (Description) |
| 100 | support bracket |
| 110 | first end |
| 120 | second end |
| 150 | first side |
| 160 | second side |
| 200 | support section |
| 202 | upper surface of support section |
| 204 | lower surface of support section |
| 210 | opening |
| 214 | first side of support section |
| 218 | second side of support portion |
| 250 | transition between support section and first portion |
| 255 | recessed area |
| 260 | angle |
| 300 | locking section |
| 310 | apex of locking section |
| 340 | first flange |
| 341 | upper face of first flange |
| 342 | lower face of first flange |
| 344 | lower end of first flange |
| 348 | upper end of first flange |
| 354 | first side of first flange |
| 358 | second side of first flange |
| 380 | second flange |
| 381 | upper face of second flange |
| 382 | lower face of second flange |
| 384 | lower end of second flange |
| 388 | upper end of second flange |
| 390 | height of second flange |
| 394 | first side of second flange |
| 398 | second side of second flange |
| 420 | angle between first and section flange |
| 800 | support rod |
| 810 | threaded area |
| 820 | first nut |
| 822 | washer for first nut |
| 830 | second nut |
| 832 | washer for second nut |
| 900 | support beam |
| 904 | arrow |
| 910 | first end |
| 920 | second end |
| 930 | web portion |

-continued

LIST FOR REFERENCE NUMERALS

| (Reference No.) | (Description) |
|---|---|
| 940 | first flange of C-section |
| 942 | socket |
| 944 | width of socket or curved section |
| 950 | second flange of C-section |
| 952 | socket |
| 954 | width of socket or curved section |
| 970 | interior |
| 972 | height of interior |
| 974 | width of interior |
| 978 | width of open section |
| 980 | longitudinal centerline |
| 1000 | supporting structure |
| 1010 | plurality of supporting beams |
| 1200 | duct |
| 1500 | rotation from non-support to supporting for bracket |
| 1510 | arrow |
| 1540 | arrow |
| 1542 | arrow |
| 1544 | arrow |
| 1550 | arrow |
| 1560 | arrow |
| 1600 | plurality of adjustment arrows |
| 1610 | arrow |
| 1620 | arrow |
| 1630 | arrow |
| 1640 | arrow |
| 2000 | supporting structure |
| 2010 | plurality of supporting beams |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A structural framework comprising:
(a) a first support beam, the first beam having opposed side walls, a web connected to said side walls and forming a C-channel shape with an interior having first and second inwardly facing sockets, each inwardly facing socket having interior and exterior surfaces, the first support beam having a longitudinal centerline, and the first support beam having a bottom opening located opposite said web and between the first and second inwardly facing sockets;
(b) a second support beam, the second support beam having opposed side walls, a web connected to said side walls and forming a C-channel shape with an interior, the opposed side walls having first and second inwardly facing sockets, each inwardly facing socket having interior and exterior surfaces, the second support beam having a longitudinal centerline;
(c) a first support bracket connected to the first support beam, the first support bracket comprising:
 (i) a first flange,
 (ii) a second flange, the first flange meeting the second flange at an apex,
 (iii) a support flange connected to the first flange,
(d) wherein the first and second flanges are located in the interior of first support beam in an assembled position wherein the apex is next to the web, and the second flange extends into and is supported by the interior surface of the second inwardly facing socket of the first support beam;
(e) wherein contact between the first flange and the exterior surface of first inwardly facing socket in combination with the support of the second flange by the interior surface of the second inwardly facing socket resists rotation of the first support bracket about an axis which is generally parallel to the longitudinal centerline of the first support beam; and
(f) wherein in the assembled position the support flange extends away from said longitudinal centerline.

2. The structural framework of claim 1, wherein the bottom opening has a width between the two inwardly facing sockets, and the second flange has a vertical length which is greater than the width of bottom opening, and furthermore the first support beam has top and a bottom portions, with the bottom opening being located on the bottom portion, when the first support beam is being supported by the first support bracket, the top portion of the first support beam is located at a height above the bottom portion of the first support beam.

3. The structural framework of claim 1, wherein the interior of the bottom opening of the first support beam has a width between the first and second inwardly facing sockets forming the C-channel shape, and the second flange has a vertical length which is greater than the width of the bottom opening between the first and second inwardly facing sockets ends forming the C-channel shape less the width of one of the two inwardly facing sockets.

4. The structural framework of claim 1, wherein the interior of the first support beam has a height, and the second flange has a vertical length which is greater than fifty percent of this height.

5. The structural framework of claim 1, wherein the interior of the first support beam has a height, and the second flange has a vertical length which is greater than sixty percent of this height.

6. The structural framework of claim 1, wherein the interior of the first support beam has a height, and the second flange has a vertical length which is greater than seventy five percent of this height.

7. The structural framework of claim 1, wherein the interior of the first support beam has a height, and the second flange has a vertical length which is greater than eighty percent of this height.

8. The structural framework of claim 1, wherein the first support bracket, when inserted into the interior of the first support beam has locked resting and supported positions relative to the longitudinal centerline of the first support beam, and the amount of relative rotation of the support bracket about an axis which is substantially parallel to the longitudinal centerline between the locked resting and supported positions relative to the longitudinal centerline of the first support beam is at least 5 degrees.

9. The structural framework of claim 1, wherein the first support bracket, when inserted into the interior of the first support beam has locked resting and supported positions relative to the longitudinal centerline of the first support beam, and the amount of relative rotation of the support bracket about an axis which is substantially parallel to the longitudinal centerline between the locked resting and supported positions relative to the longitudinal centerline of the first support beam is at least 10 degrees.

10. The structural framework of claim 1, wherein the first support bracket, when inserted into the interior of the first support beam has locked resting and supported positions relative to the longitudinal centerline of the first support beam, and the amount of relative rotation of the support bracket about an axis which is substantially parallel to the longitudinal centerline between the locked resting and supported positions relative to the longitudinal centerline of the first support beam is at least 15 degrees.

11. The structural framework of claim 1, wherein the first support bracket, when inserted into the interior of the first support beam has locked resting and supported positions relative to the longitudinal centerline of the first support beam, and the amount of relative rotation of the support bracket about an axis which is substantially parallel to the longitudinal centerline between the locked resting and supported positions relative to the longitudinal centerline of the first support beam is at least 20 degrees.

12. The structural framework of claim 1, wherein the first support bracket, when inserted into the interior of the first support beam has locked resting and supported positions relative to the longitudinal centerline of the first support beam, and the amount of relative rotation of the support bracket about an axis which is substantially parallel to the longitudinal axis between the locked resting and supported positions relative to the longitudinal centerline of the first support beam is at least 30 degrees.

13. The structural framework of claim 1, wherein the first support bracket, when inserted into the interior of the first support beam has locked resting and supported positions relative to the longitudinal centerline of the first support beam, and the amount of relative rotation of the support bracket about an axis which is substantially parallel to the longitudinal centerline between the locked resting and supported positions relative to the longitudinal centerline of the first support beam is at least 45 degrees.

14. The structural framework of claim 1, wherein the first support bracket is inserted into the interior of the first support beam through a first end of the support beam, and cannot be inserted through the bottom opening of the first support beam.

15. The structural framework of claim 1, wherein the first and second flanges of the first support bracket form a V-shape.

16. A structural framework comprising:
(a) a first support beam, the first support beam having a web and side walls forming a C-channel shape with an interior, each side wall having an inwardly facing socket;
(b) a second support beam, the second support beam having a web and side walls forming a C-channel shape with an interior, each side wall having an inwardly facing socket;
(c) a first support bracket connected to the first support beam, the first support bracket comprising:
(i) a first flange,
(ii) a second flange, the first flange meeting the second flange at an apex and forming an angle with the second flange,
(iii) a support section connected to the first flange,
wherein the first and second flanges are located in the interior of first support beam in an assembled position, and the support section extends below one of the inwardly facing sockets of the first support beam and connects to the first flange;
(d) wherein a second support bracket connected to the second support beam in an assembled position, the second support bracket comprising:
(i) a first flange,
(ii) a second flange, the first flange meeting the second flange at an apex next to said web and forming an angle with the second flange,
(iii) a support section is connected to the first flange and extending laterally away from said interior,
wherein the first and second flanges are located in the interior of second support beam in an assembled position, and the second flange is located in an inwardly facing socket of the second support beam, and the first flange extends below one of the inwardly facing sockets of the second support beam and connects to the first support planer section.

17. A structural framework comprising:
(a) a first support beam, the first support beam having side walls and a web forming a C-channel shape with an interior, the side walls being vertically oriented and having first and second inwardly facing sockets, each inwardly facing socket having interior and exterior surfaces, the first support beam having a longitudinal centerline, and a cross section of the first support beam being made by an intersecting plane containing the longitudinal centerline;
(b) a second support beam, the second support beam having side walls and a web forming a C-channel shape with an interior, the side walls and the web having first and second inwardly facing sockets, each inwardly facing socket having interior and exterior surfaces, the second support beam having a longitudinal centerline;
(c) a first support bracket connected to the first support beam, the first support bracket comprising:
(i) a first flange,
(ii) a second flange, the first flange meeting the second flange at an apex and forming an angle with the second flange,
(iii) a support section connected to the first flange and extending laterally from the first flange externally of said interior of said first support beam;
(d) wherein the first and second flanges are located in the interior of the first support beam in an assembled position, and the second flange is supported by the second inwardly facing socket of the first support beam, and the support section has a laterally extending portion beyond being directly below the interior of the first support beam;
(e) wherein the first flange is extending below the first inwardly facing socket of the first support beam, and wherein the support section includes an opening for connection with a first support rod; and
(f) wherein, when the first support rod is connected to the support section in the laterally extending portion beyond being directly below the interior of the first support beam, and passing through the opening, the first support rod remains outside of the cross section of the first support beam when said cross section is projected vertically down from the longitudinal centerline of the first support beam.

18. A structural framework comprising:
(a) a first support beam, the first beam having a web and opposed side walls forming a C-channel shape with a beam interior, the side walls being vertically oriented and having first and second inwardly facing flanges, and the interior having a first longitudinal centerline;
(b) a second support beam, the second beam having a web and opposed side walls forming a C-channel shape with a beam interior, the side walls having first and second inwardly facing flanges, and the interior having a second longitudinal centerline;

(c) a first support bracket connectable to the first support beam, the first support bracket comprising:
  (i) a first flange of the first support bracket,
  (ii) a second flange, the first flange of the first support bracket meeting the second flange of the first support bracket at an apex and forming an angle with the second flange of the first support bracket,
  (iii) a support section connected to the first planer flange of the first support bracket externally of the beam interior, (d) wherein the first support bracket is movable between locked and unlocked states relative to the first support beam, and the first support beam changes from an unlocked state to a locked state relative to the first support bracket by rotation in a first rotational direction about an axis which is generally parallel to the first longitudinal centerline and creating a rotational locking force between the first support bracket and the first support beam which increases as the amount of weight supported by the first support bracket is increased;

(e) wherein the first support bracket changes from the locked state to the unlocked state relative to the first support bracket by rotation in a second rotational direction about an axis which is generally parallel to the first longitudinal centerline, but opposite of the first rotational direction of the first support bracket, wherein in the locked state the first support bracket imparts a net rotational torque on the first support beam;

(f) a second support bracket connectable to the second support beam, the second support bracket comprising:
  (i) a first flange of the second support bracket,
  (ii) a second flange of the second support bracket, the first flange of the second support bracket meeting the second flange of the second support bracket at an apex and forming an angle with the second planer flange of the second support bracket,
  (iii) a support section connected to the first planer flange of the second support bracket externally of the beam interior, wherein the second support bracket has locked and unlocked states relative to the second support beam, and the second support bracket changes from the unlocked state to a locked state relative to the second support beam by rotation in a first rotational direction about an axis which is generally parallel to the second longitudinal centerline and creating a rotational locking force between the second support bracket and the second support beam which increases as the amount of weight supported by the second support beam is increased, and the second support bracket changes from the locked state to the unlocked state relative to the second support bracket by rotation in a second rotational direction about an axis which is generally parallel to the second longitudinal centerline, but opposite of that of the first rotational direction of the second support bracket, wherein in the locked state the second support bracket imparts a net rotational torque on the second support beam.

* * * * *